J. R. ACHENBACH.
REIN HOLDER.
No. 103,820.
Patented June 7, 1870.
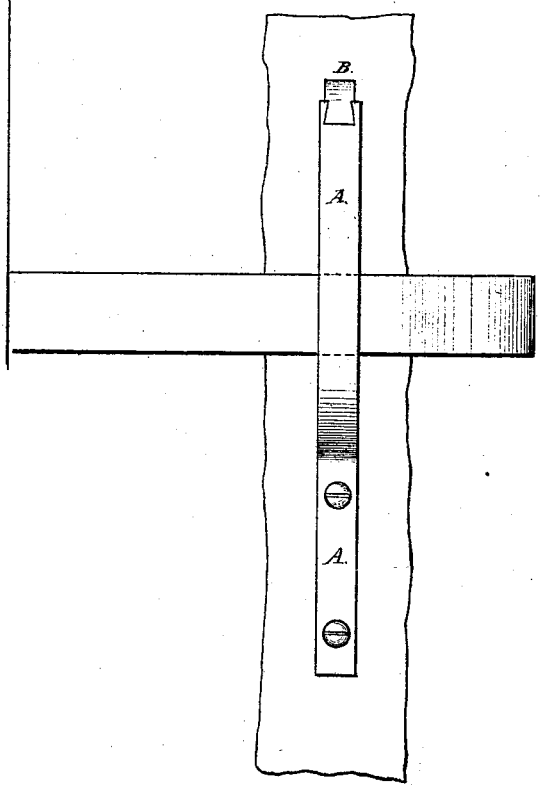
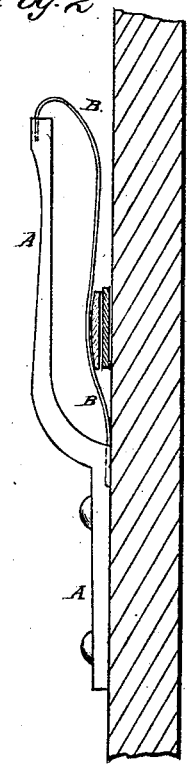

UNITED STATES PATENT OFFICE.

JOHN R. ACHENBACH, OF SADDLE RIVER, NEW JERSEY.

IMPROVEMENT IN REIN-HOLDERS.

Specification forming part of Letters Patent No. 103,820, dated June 7, 1870.

*To all whom it may concern:*

Be it known that I, JOHN R. ACHENBACH, of Saddle River, in the county of Bergen and State of New Jersey, have invented a new and useful Improvement in Rein-Holders; and I do hereby declare that the following is a full, clear, and exact description thereof, which will enable others skilled in the art to make and use the same, reference being had to the accompanying drawing, forming part of this specification.

Figure 1 is a front view of my improved rein-holder. Fig. 2 is a side view of the same.

Similar letters of reference indicate corresponding parts.

My invention has for its object to furnish a simple and convenient device for holding the reins when the team is standing, which shall be simple in construction, easily attached to the wagon, and which will hold the reins securely, and, at the same time, in such a way that they may be instantly detached when required; and it consists in the rein-holder constructed as hereinafter more fully described.

A is an arm, the lower part of which is made straight, and with two or more holes to receive the screws, bolts, or rivets by means of which it is secured to its support. The upper part of the arm A is curved outward, and extends upward, so as to leave a space between the said upper part of the said arm and the dash-board or other support to which it is attached. To the upper end of the arm A, which should be slightly elastic, is securely attached the upper end of the spring B, which is curved downward, and its lower end is placed in a socket or recess in the lower part of the arm A, as shown in Fig. 2, and is secured by hammering or closing down the side edges of the said recess upon the said spring. The spring B may, if desired, or more convenient, be formed solid with the arm A.

The device A B may be attached to the dash-board, box, or seat of the vehicle, or to the bows of its cover or top, as may be desired or convenient, reference being had to the character of the vehicle to which it is attached.

In using the holder, the reins are passed between the spring B and the support to which the said holder is attached, and are securely held by the elasticity of the spring B in such a way that they may be instantly detached when required.

Having thus described my invention, I claim as new and desire to secure by Letters Patent—

The curved slightly-elastic arm A and the curved spring B, attached to said arm, as shown in Fig. 2 of drawing, both combined and applied to a dash-board, as and for the purpose described.

JOHN R. ACHENBACH.

Witnesses:
GEO. W. MABEE,
JAMES T. GRAHAM.